United States Patent [19]
Thompson

[11] Patent Number: 4,865,275
[45] Date of Patent: Sep. 12, 1989

[54] LAND, WATER AND AIR CRAFT

[75] Inventor: Harold L. Thompson, Okmulgee, Okla.

[73] Assignee: Alpha Images, Ltd., Henryetta, Okla.

[21] Appl. No.: 63,721

[22] Filed: Jun. 16, 1987

Related U.S. Application Data

[63] Continuation-in-part of Ser. No. 894,754, Aug. 11, 1986, abandoned, which is a continuation of Ser. No. 800,083, Nov. 19, 1985, abandoned, which is a continuation of Ser. No. 611,371, May 16, 1984, abandoned, which is a continuation of Ser. No. 502,694, Jun. 9, 1983, abandoned, which is a continuation of Ser. No. 276,031, Jun. 22, 1981, abandoned.

[51] Int. Cl.$^4$ ................................................ B64C 3/52
[52] U.S. Cl. .................................. 244/219; 244/36; 244/214; 244/215; 244/2
[58] Field of Search ............... 244/2, 12.1, 12.2, 12.6, 244/23 R, 23 C, 36, 38, 34 A, 50, 213, 214, 219; 441/65, 66

[56] References Cited

U.S. PATENT DOCUMENTS

| | | | |
|---|---|---|---|
| 1,836,319 | 12/1931 | Gehrung | 244/54 |
| 3,055,613 | 9/1962 | Taylor | 244/12.2 |
| 3,261,572 | 7/1966 | Gorton | 244/2 |
| 3,341,125 | 9/1967 | Sweeney et al. | 244/23 C |
| 3,734,432 | 5/1973 | Low | 244/76 C |
| 3,785,592 | 1/1974 | Kerruish | 244/12.2 |

FOREIGN PATENT DOCUMENTS

| | | | |
|---|---|---|---|
| 1331655 | 9/1973 | United Kingdom | 244/12.2 |

Primary Examiner—Joseph F. Peters, Jr.
Assistant Examiner—Rodney Corl
Attorney, Agent, or Firm—Robert B. Stevenson

[57] ABSTRACT

A multi-media craft particularly designed and constructed for efficient and economical utilization on land, water and in the air and comprising a light weight body constructed in modular form for economy and power by a removable lightweight engine of the motorcycle type for fuel efficiency and ease of maintenance. The craft is provided with forward and rearward sections constructed in a manner for variable in-flight or in-use alteration or molding thereof for achieving the optimum planar or contour design for the craft as required during variable fluid conditions when airborne, thus providing efficient and safe flying operation for either an unskilled or skilled operator.

8 Claims, 12 Drawing Sheets

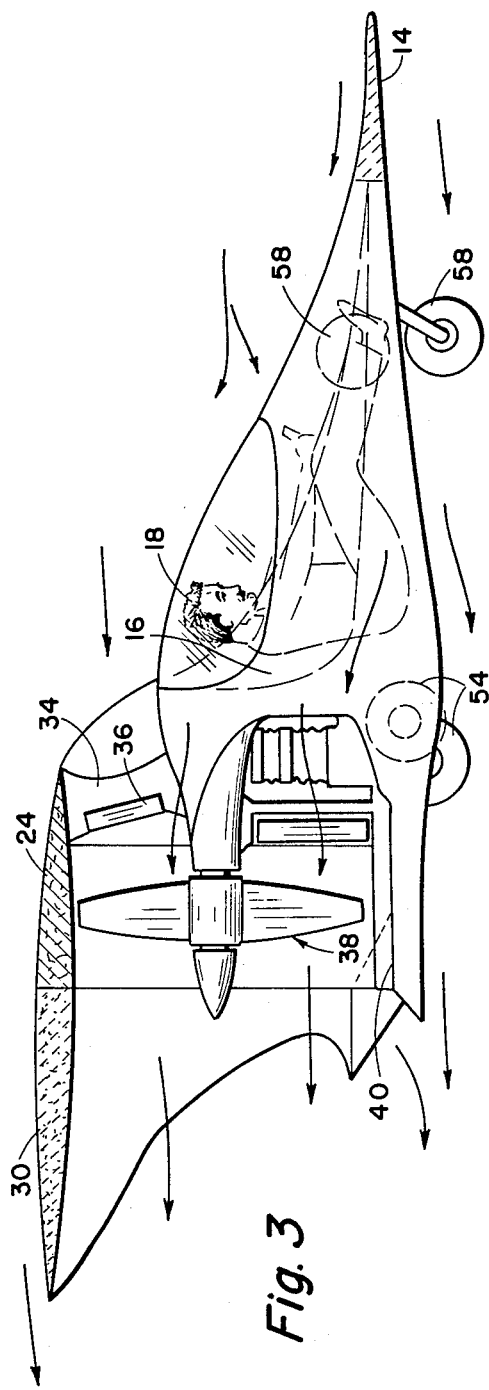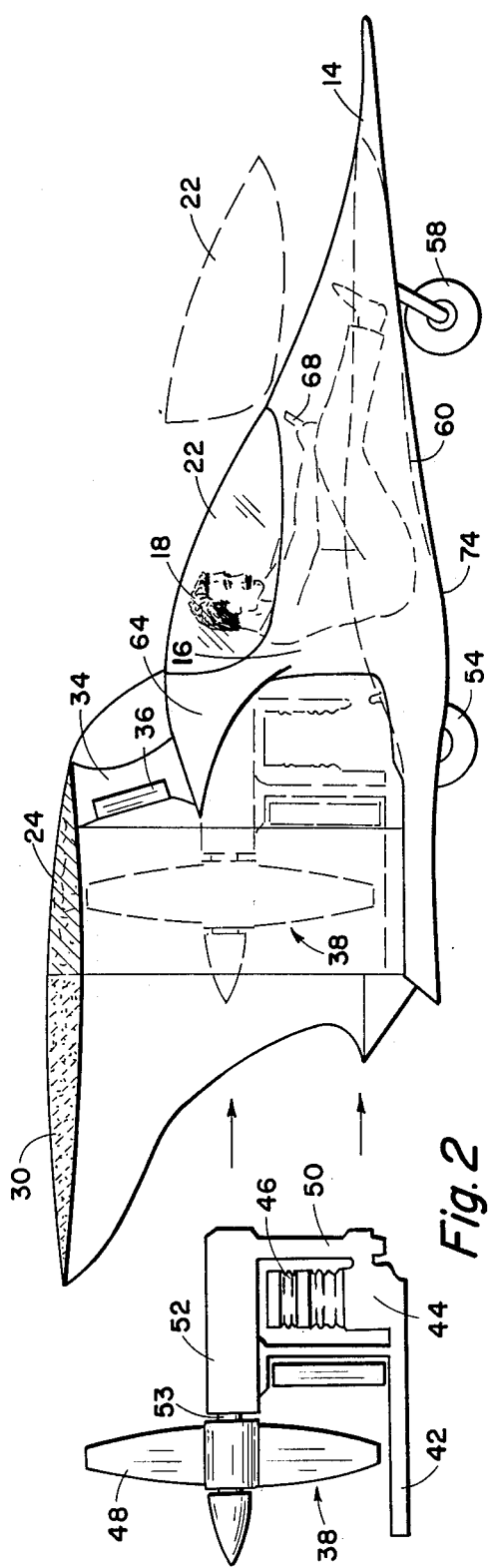

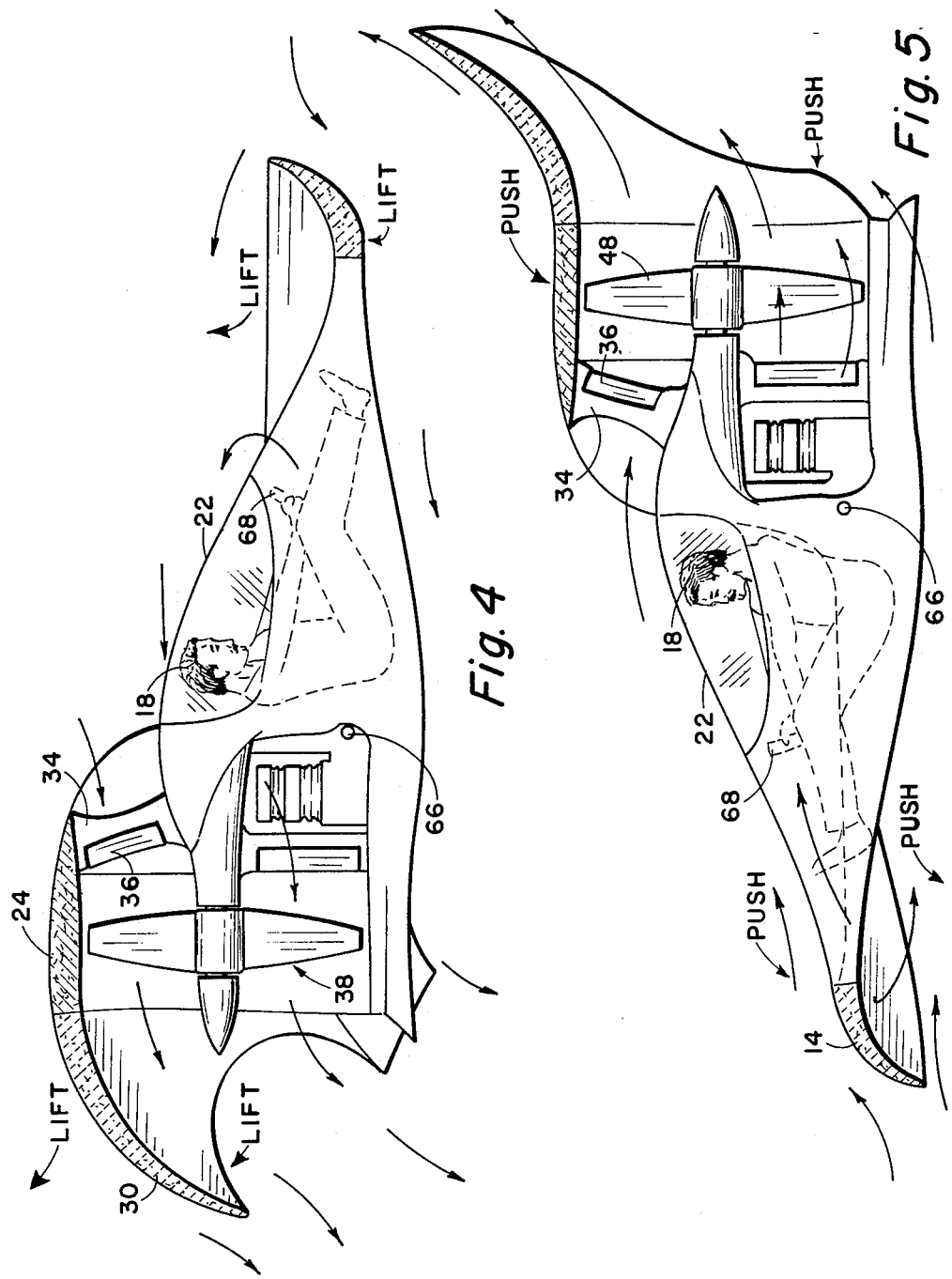

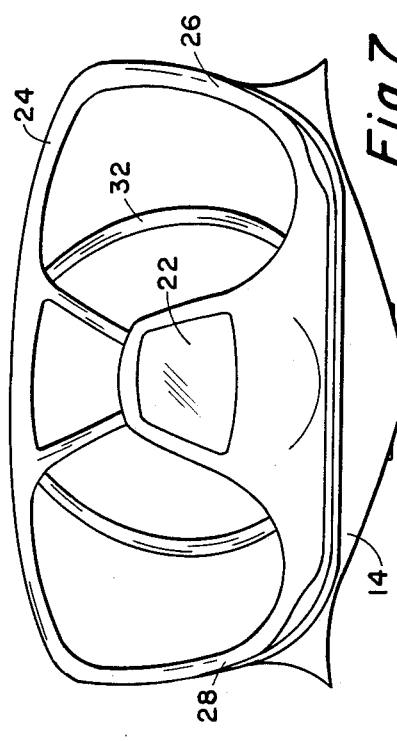
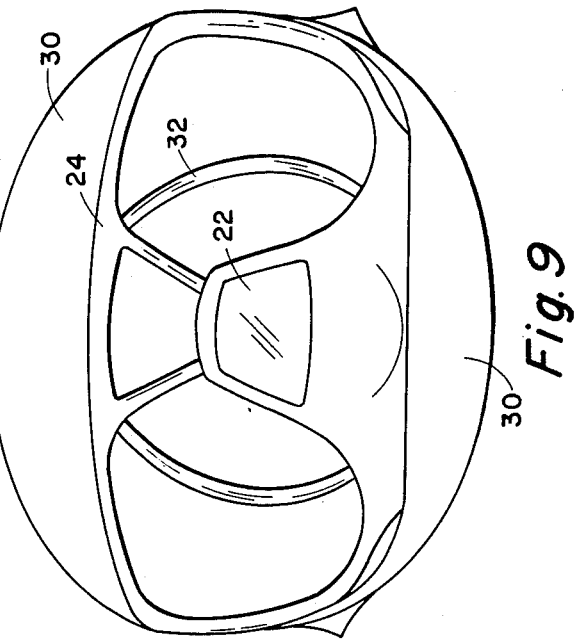
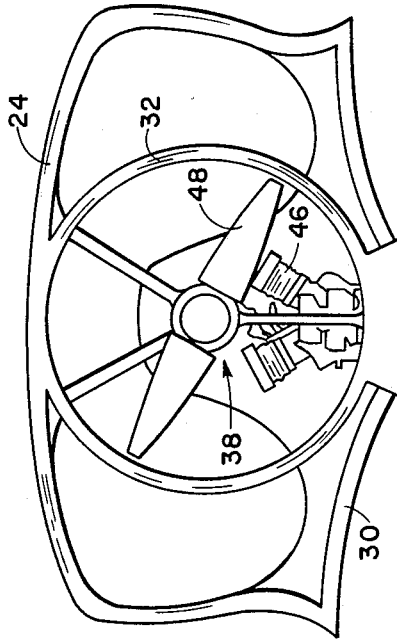
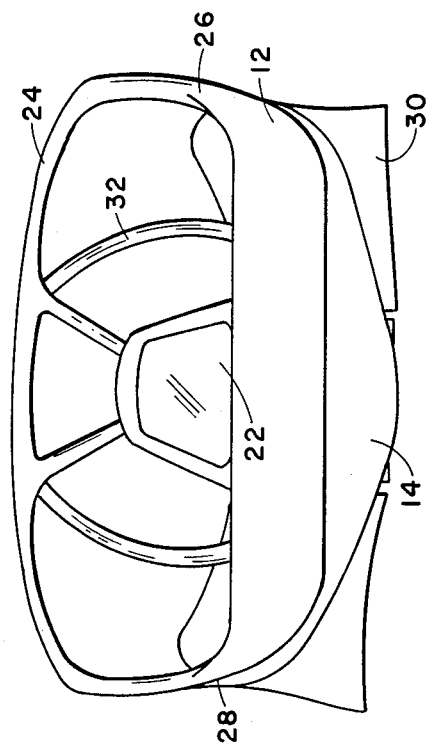

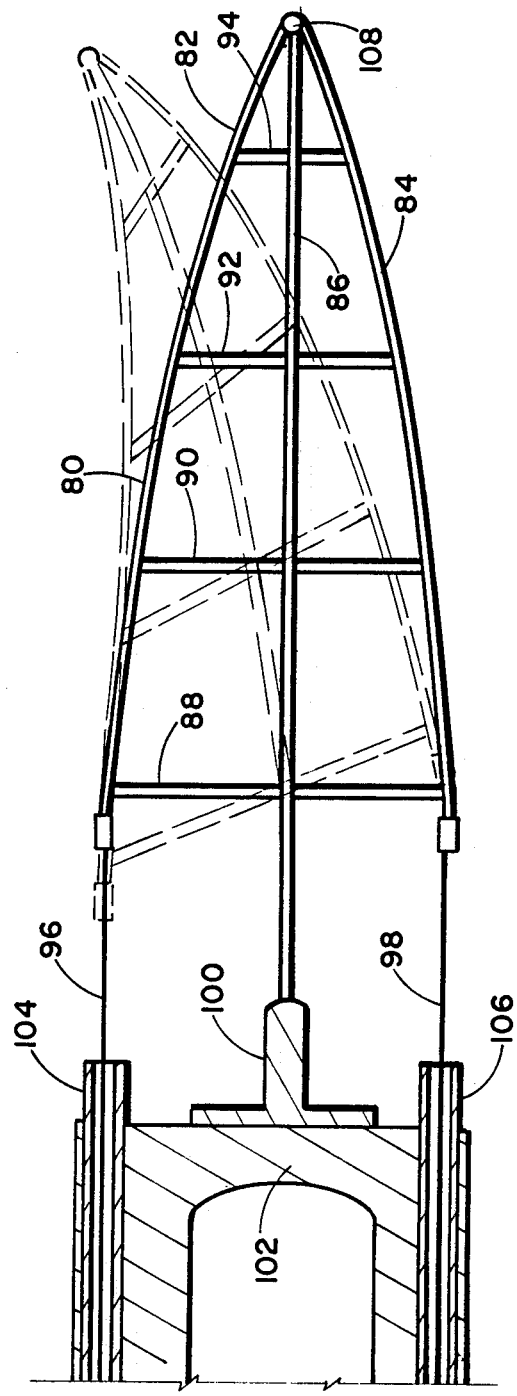

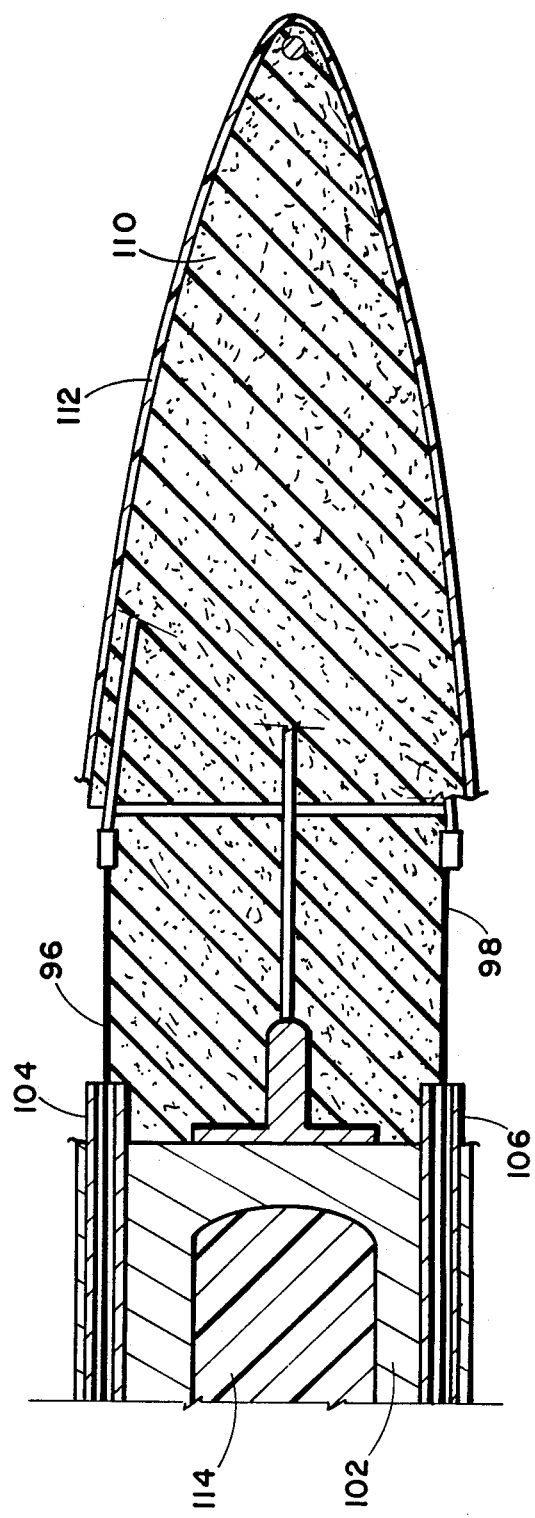

LAND, WATER AND AIR CRAFT

This is a continuation-in-part of co-pending application Ser. No. 894,754 filed on Aug. 11, 1986, which is a continuation of application Ser. No. 800,083 filed Nov. 19, 1985, which is a continuation of application Ser. No. 611,371 filed May 16, 1984, which is a continuation of application Ser. No. 502,694 filed June 9, 1983, which is continuation of Ser. No. 276,031 filed June 22, 1981, all now abandoned.

BACKGROUND OF THE INVENTION

1. Field of the Invention

This invention relates to improvements in vehicles and more particularly, but not by way of limitation, to a land, air and watercraft or vehicle.

2. Description of the Prior Art

With the current energy shortages and general world economy there is an ever increasing need and demand for energy efficient and economical modes of transportation, not only on land, but also on water and in the air. In addition, simplicity of operation of a vehicle is becoming increasingly important since public transportation is woefully lacking in adequacy, and transportation has become more and more a personal problem whereby individual vehicle operation becomes essential. Much of the present day approach to the solution of these problems has been directed toward improved engine or power plant design for increasing fuel efficiency to relieve the energy requirements and provide some economy of vehicle operation. These solutions do not tough the need for simplistic modes of transportation. Other approaches to the overall problem have been in the area of vehicle configuration of design to improve the operating efficiency by increasing the weight of the vehicle, increasing the flow characteristics of the body design, and the like, to achieve an economy of operation and efficiency of energy utilization. For example, high performance lightweight vehicles have been developed by Craig Catto as described in the May, 1981, issue of Homebuilt Aircraft Magazine which provides an effective transportation mode for travel. Vehicles of this type, however, do not reach the problem of safety universally on land, water, and air space, and are limited in scope as to benefit to social needs.

SUMMARY OF THE INVENTION

The present invention contemplates a novel lightweight craft capable of mobility in the air, on land, or in the water, and having extremely simple operation systems whereby an individual may become a safe and competent operator of the craft with a minimum of time or instruction. The novel craft or vehicle is generally of a modular construction, but not limited thereto, with the modules being formed generally from a plastic composition, such as a foam material, and secured together in the assembled position by suitable fasteners or adhesives. This provides an exceptionally light construction for the craft coupled with great strength for the body of the craft. Portions of the body are flexible whereby the overall contour of the craft may be "molded in operation" at the control of the operator for achieving optimum operational characteristics during movement through the air space, on land, or through the water. This novel contour-variable construction provides for such stability of movement through the air, it substantially eliminates "crash landings" since the craft's designed balance allows it to settle easily onto the surface of the earth even upon loss of all power, and permits a slow fully controlled rate of speed when desired to increase the operational safety of the craft. In addition, the craft is readily maneuverable on land in that it is provided with at least one steerable wheel and at least one powered or driven wheel engagable with the surface of the ground. The unitized construction of the craft coupled with the overall operating contours thereof result in a safe and efficient operation of the craft in water, with the operation thereof being generally similar as in flight through the air. The power plant for the novel craft is conceived to be a lightweight four cycle engine, such as a well known motorcycle-type engine, but not limited thereto, and is removably mounted at the rear of the body to provide a pushertype actuation for the craft. The ease of removal of the power plant greatly facilitates maintenance thereof for further increasing the overall economy of the vehicle. The novel craft is simple and efficient in operation and economical and durable in construction.

BRIEF DESCRIPTION OF THE DRAWINGS

FIG. 2 is a side elevational view, partly in section, of a vehicle embodying the invention, and showing the land traversing mode of the vehicle, with the removable mounting for the power plant of the vehicle being particularly illustrated.

FIG. 3 is a view similar to FIG. 2 depicting the level flight mode of the vehicle moving through air and with wheels retracted shown in broken lines.

FIG. 4 is a view similar to FIG. 3 and illustrates the high lift mode for the vehicle moving upwardly through air.

FIG. 5 is a view similar to FIG. 3, reversed with respect thereto and illustrates a fast descent mode for the vehicle moving downwardly through air.

FIG. 6 is a rear elevational view of a vehicle embodying the invention, illustrating the level flight planing mode of operation for the vehicle in the air.

FIG. 7 is a front elevational view of a vehicle embodying the invention, illustrating a level flight planing operational mode for the vehicle in the air.

FIG. 8 is a view similar to FIG. 7 and illustrates a lift mode of operation for the vehicle in the air.

FIG. 9 is a view similar to FIG. 7 and illustrates a descent operational mode for the vehicle in the air.

FIG. 13 illustrates a side elevational view, partly in section, of one preferred embodiment of the deformable peripheral means showing in particular, the structural skeleton of the deformable peripheral means.

FIG. 14 illustrates a cross-sectional side elevational view of the deformable peripheral means of FIG. 13 further illustrating the presence of the inner flexible filler foam and outer flexible sealer skin.

Figure 15:
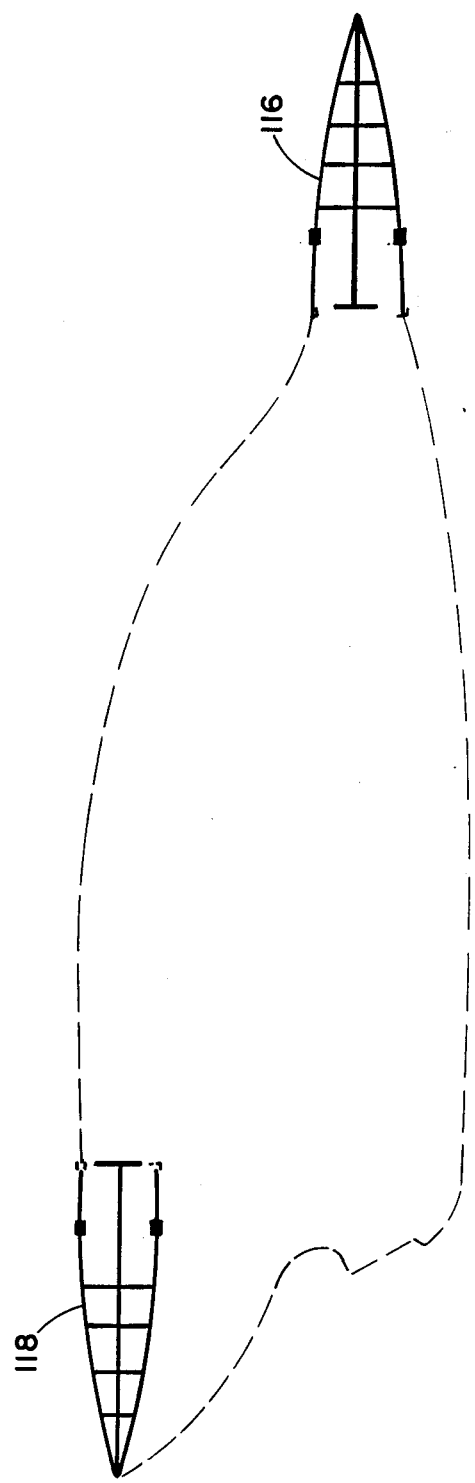

FIG. 15 is a partial cut-away side elevational view of a vehicle schematically illustrating the typical positioning of the deformable peripheral means of FIGS. 13 and 14.

Figure 16:
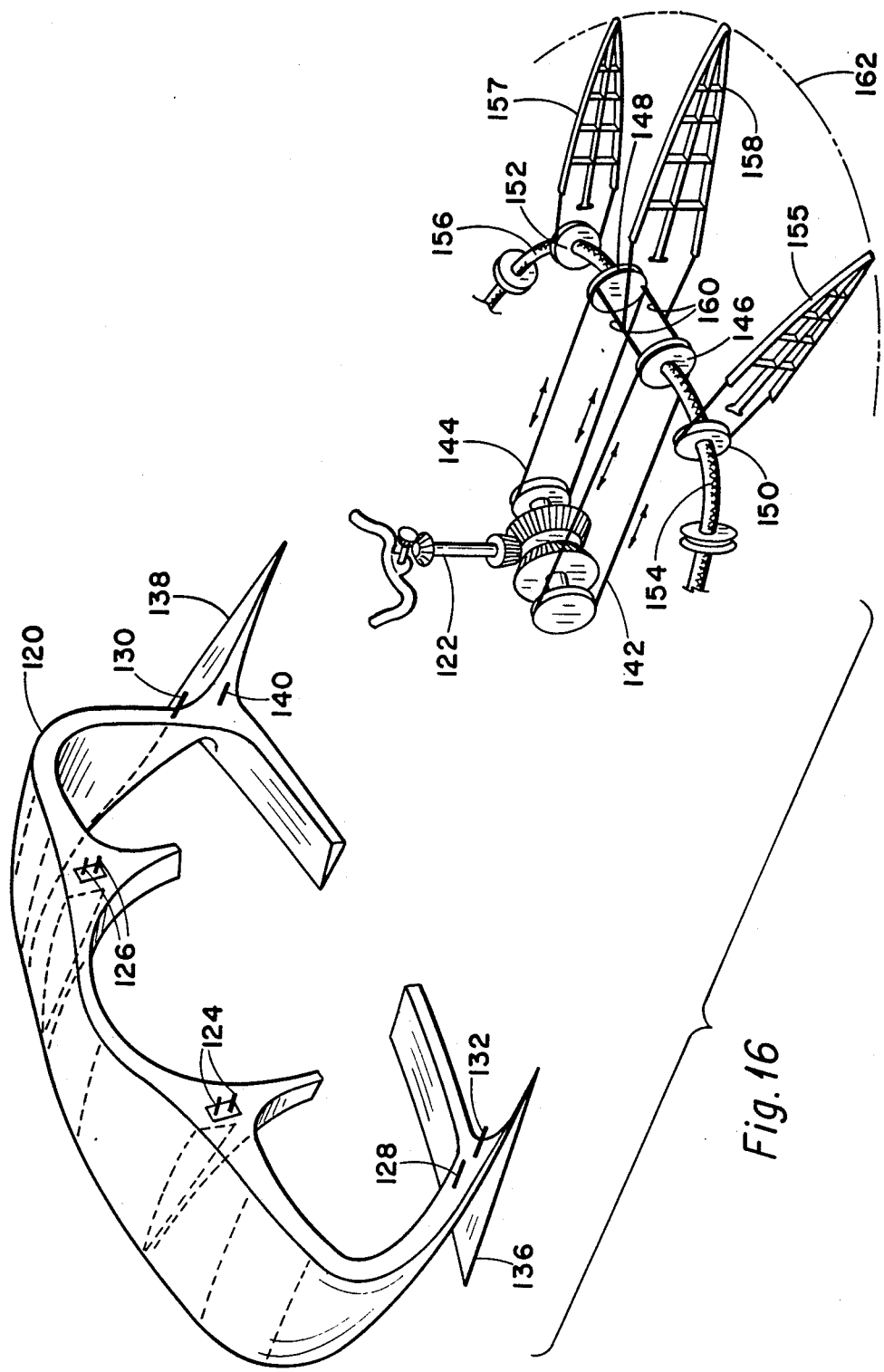

FIG. 16 is a perspective view, partly in section, of a vehicle embodying the invention, illustrating the typical positioning of the control mechanism and flexible control surfaces of the deformable peripheral means.

Figure 17:
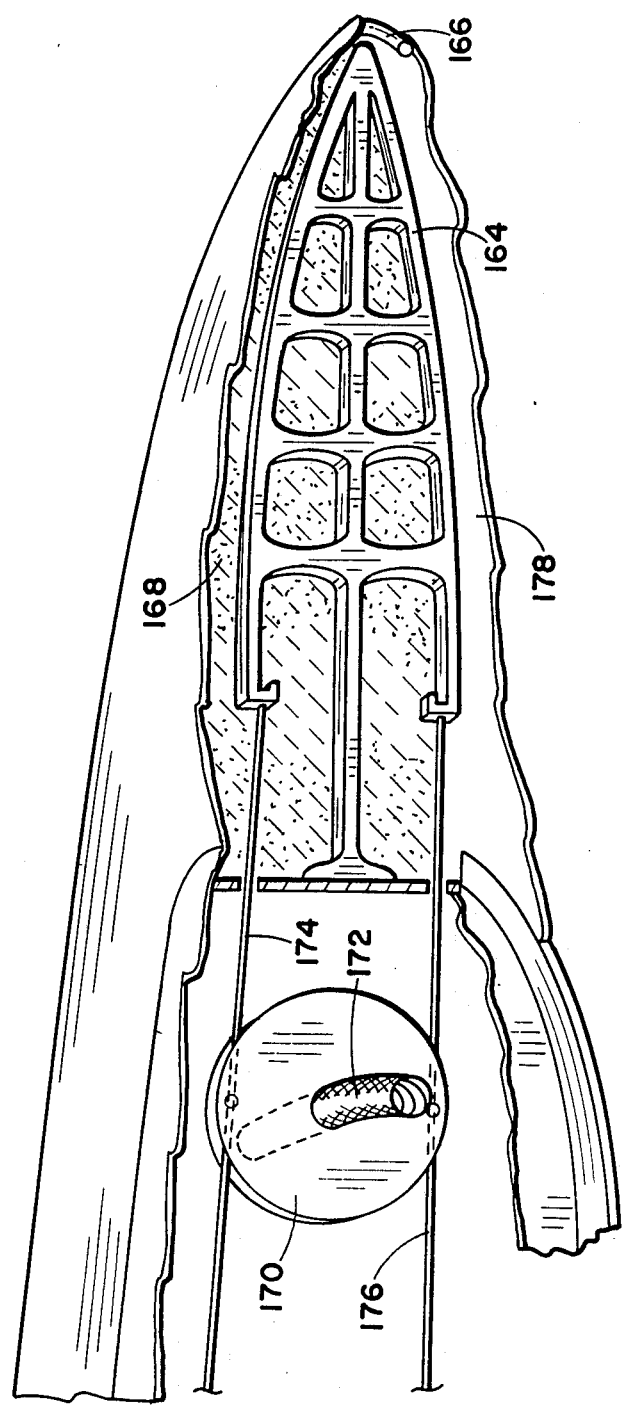

FIG. 17 is a close up, partial cut-away view of the individual elements making up the control mechanism and flexible control surface of the deformable peripheral means illustrated in FIGS. 16.

Figure 18:
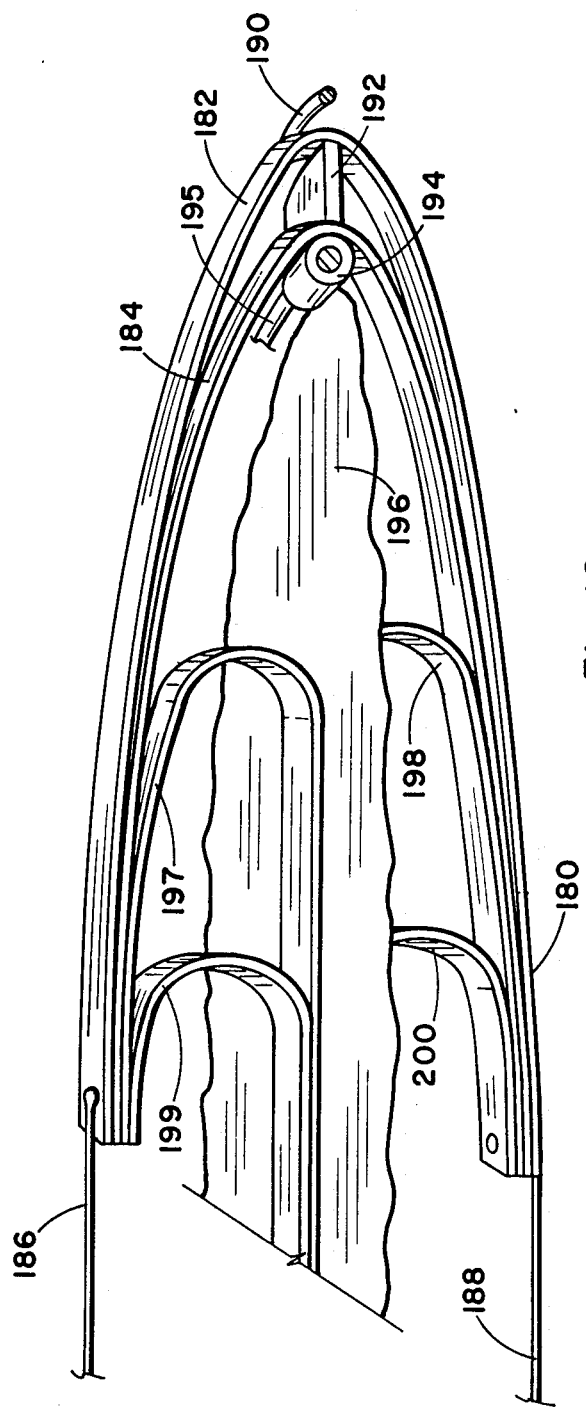

FIG. 18 illustrates a side elevational view, partly in section, of another preferred embodiment of the deformable peripheral means according to the present invention showing, in particular, a dual stage flexible control surface.

Figure 19:
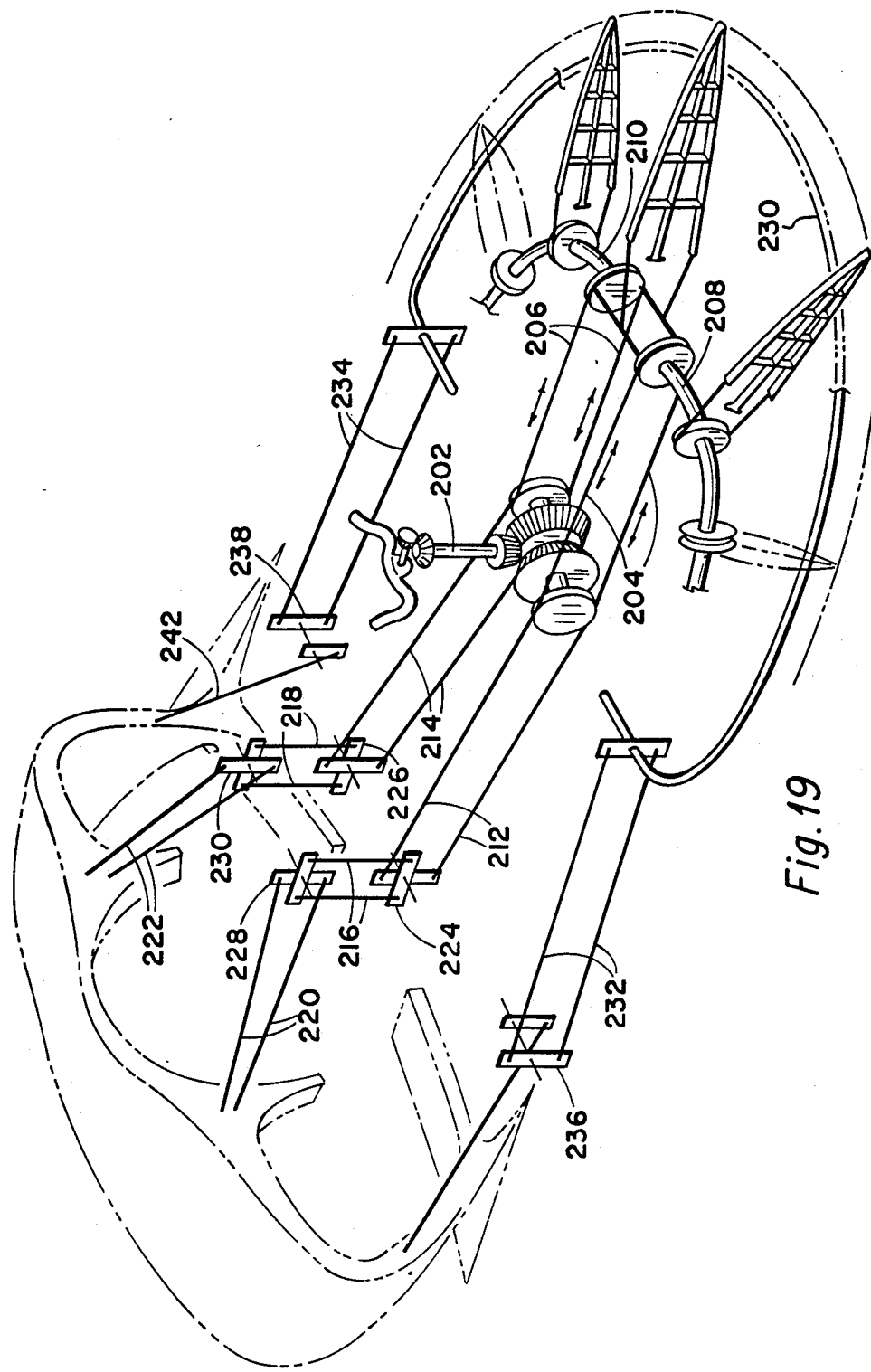

FIG. 19 illustrates, in a skeletal representation, a typical control mechanism for an alternate preferred embodiment of the deformable peripheral means of FIG. 18.

DETAILED DESCRIPTION OF THE PREFERRED EMBODIMENT

Referring to the drawings in detail, reference character 1 generally indicates a land, air, space and water craft or vehicle comprising a main body portion 12 constructed from a suitable lightweight and strong material and having a forward or front control wrap-around section 14 secured thereto in any well known manner, such as by a suitable fastener, or connectors. The wrap-around section 14 is constructed from a flexible light and strong material with suitable struts embedded therein, said struts being constructed from flexible materials, such as wires, bands, or the like operable or movable to variable positions for altering the contour of the wrap-around section 14 as will be hereinafter set forth in detail. The forward portion of the body 12 is generally hollow, providing a cockpit 16 therein having the usual seat means (not shown) for supporting an operator and/or payload 18. The body 12 is provided with a port 20 providing access to the interior of the cockpit 16, and a suitable transparent canopy 22 is removably secured to the port 20 in any well known manner. The trailing or rearward portion of the body 12 is of a substantially hollow, flattened cylindrical configuration, as shown at 14, with the forward portion and rear portions of the body 12 blending together in upwardly curving sidewall members 26 and 28. A rear wrap-around section 30 of a construction similar to the wrap-around section 14 is provided at the trailing edge of the rear section 24 and is secured thereto in any suitable manner, such as an appropriate fastening material. Suitable struts are embedded in the wrap-around section 30 and are preferably constructed from suitable wires, bands, etc. which are flexible and operable for altering the configuration of the wrap-around section 30 as will be hereinafter set forth.

A ducted fan shroud 32 is concentrically disposed within the rear section 24 and secured therein in any suitable manner and if desired may become an integral part and brace for the overall body 12. The shroud 32 is also preferably constructed from a laminated structural material for reduction of weight of the craft 10. A pair of angularly extending body supports 34, each having a trim control 36 pivotally secured thereto, are secured between the forward edge of the rear portion 24 and the upper portion of the body 12 in the proximity of the port 20. These supports 34 also add to the support of the body 12. A power plant assembly 38 is removably secured within the fan duct shroud 32 and disposed at the rear of the cockpit 20. Whereas the assembly 38 may be mounted within the shroud 32 in any suitable manner, as shown herein a pair of spaced mutually parallel elongated grooves or recesses 40 (only one of which is shown in FIG. 3) are provided in the lower portion of the inner periphery of the shroud 32 for slidably receiving a pair of spaced mutually parallel rail members 42 (only one of which is shown in FIG. 2). The rail members 42 are secured in said spaced relationship by suitable cross members (not shown). A motor mount pad 44 is carried by the rail members 42 and may be either rigidly secured thereto or integral therewith as desired, for supporting any suitable engine 46. The engine 46 is preferably an air cooled type engine, such as a four cycle 1200 cc motorcycle engine developing 80 horsepower and 5000 RPM with the air densities and factors normal at sea level. It has been calculated that this type engine should provide cruising speed in excess of two hundred thirty mph at sixty five per cent power when flying at 10,000 feet. These calculations were based on the use of a standard variable pitch propeller with only the tips support air flow 48 which is operably connected with the engine 46. However, it is to be noted that any suitable propeller may be used but it is preferable that the fan blade 48 be a variable pitch propeller, emparting even air flow over the span of the blade but not limited thereto. The propeller 48 is disposed rearwardly of the engine 46 when the assembly 38 is installed within the shroud 32, and may be supported in any suitable manner, such as by a support post means 50 housing suitable drive mechanisms (not shown) and outwardly extending arm means 52 secured to the rail members 42 and having the propeller drive shaft 53 journalled therein, as particularly shown in FIG. 2.

Figure 1:
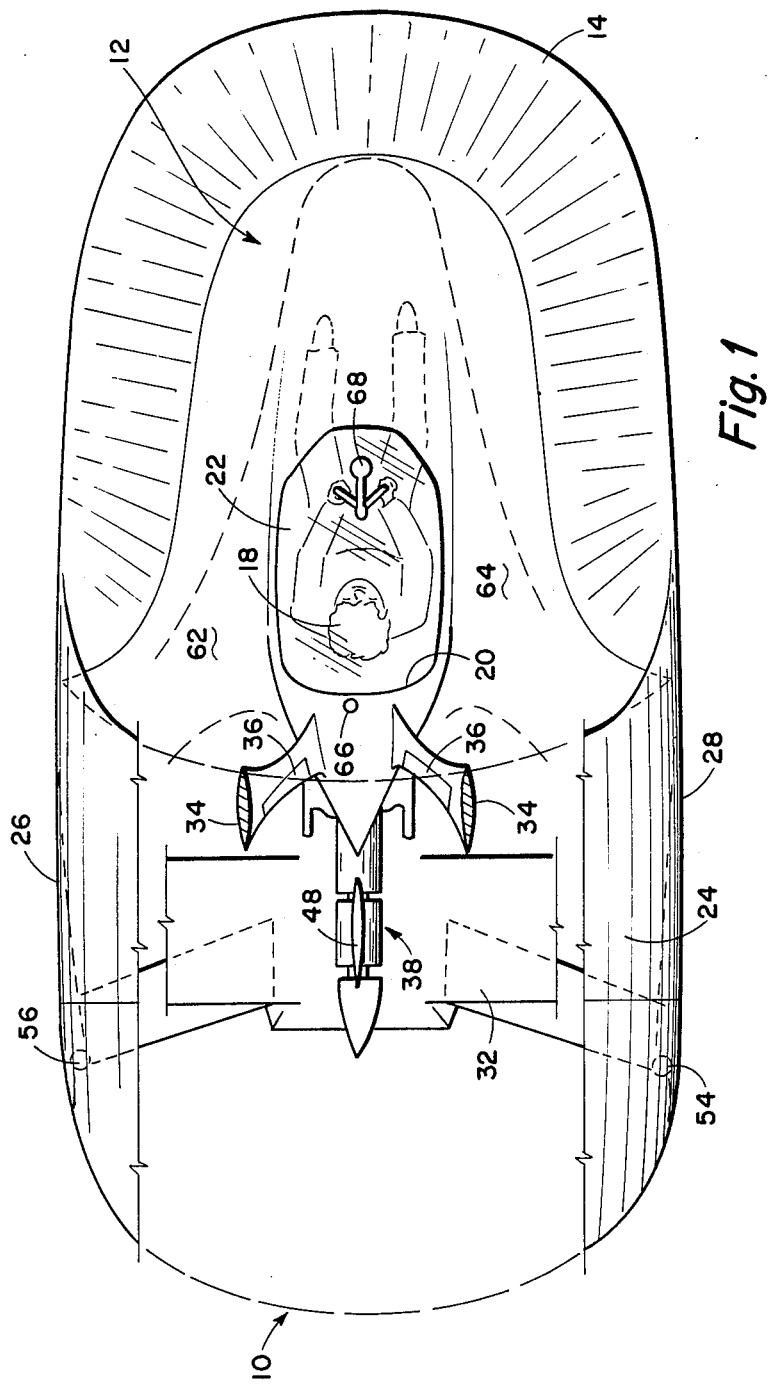
FIG. 1 is a plan view of a vehicle embodying the invention, depicted partially in section and partly cutaway, with portions shown in broken lines for purposes of illustration.

It is preferable to provide a tricycle-type wheel arrangement for the craft 10, but there is no intention of limiting the structure of the vehicle to this wheel design. As shown herein a pair of rear wheels or stabilizers are located in spaced relation as shown at 54 and 56 in FIG. 1, and a front or forward wheel 58 is preferably substantially centrally disposed in the proximity of the forward or leading end of the body 12. It is also preferable to provide the body with appropriate recesses or wheel wells (not shown) in the proximity of each wheel for facilitating retracting of the wheels in the flying mode to achieve streamlining of the craft 10, as is well known.

The cross sectional configuration of the body 12 in the area of the sidewall members 24 and 26 is substantially as shown in broken lines at 60 in FIG. 2, with the main portion of the cross section 60 defining a substantially rectangular area. In addition, the gentle contouring of the bottom surface of the body 12 provides an overall dual reaction to the air in the flying mode of the craft 10, said reaction being both a body lifting and planing action during flight. The outer periphery of the body 12 is raised or "humped" slightly in the areas 62 and 64 disposed at the opposite sides of the opening 20 to properly control air flow over the upper surface of the craft 10 during travel thereof, as will be hereinafter set forth in detail. As hereinbefore set forth, the configuration of the wrap-around sections 14 and 30 may be altered during travel or movement of the craft 10 to cooperate with the contours of the upper and under surfaces of the body 12 for providing a controlled use of the air flowing over the outer periphery of the craft 10, thus providing a maximum efficiency of operation therefor. The critical center of gravity of the body 12 is dead center of the vehicle mass and is indicated at 66 in FIGS. 4, 5 and 10. There are centers of weight and designs and air flow that lend support to this critical center of gravity.

Of course, suitable steering mechanisms generally indicated at 68 is provided in the cockpit 22 for operation by the operator 70 of the craft 10. The steering mechanism 68 is operably connected in any well known manner between the cockpit 16 (not shown) and the power plant assembly 38 for control of the propeller 48 and operation of the engine 46, and is similarly operably connected in any well known manner (not shown) from the cockpit with the struts (not shown) embedded within both the wrap-around sections 14 and 30 for manipulation thereof. The steering mechanism 68 is also operably connected in the usual manner with the trim controls 36 for actuation thereof and the front wheel 48 for steering thereof, the steering of the front wheel 58 being provided for particular facilitation of the use of the craft as a land vehicle. It is to be noted a flexible stabilizing strut (not shown) is embedded within and extends along the leading edge of the wrap around section 14 and trailing edge of the section 30.

When the craft 10 is utilized as a land vehicle as shown in FIG. 2, the operation thereof is substantially identical with the operation of the usual land vehicle, with the rear wheels 54 and functioning in much the manner as "training wheels" on such a vehicle. Thus, it is relatively simple for the operator 70 to become proficient in the land operation of the craft. When the vehicle 10 is utilized on water, the operation is much the same as that of the well known air boat, and is controlled by warping of the surfaces or configurations of the wraparound sections 14 and 30 in the manner as will be hereinafter set forth in connection with the operation of the craft during air travel.

In the air, the craft 10 is a highly controllable, safe and fast craft. FIGS. 3 through 11 particularly illustrate the action of the craft 10 moving through air in the flight mode therein. FIG. 3 illustrates the cross-sectional configuration of the wrap around sections 14 and 30 in the level flight operation of the craft 10 in the air, with the arrows illustrating the flow of air around and over the outer periphery of the body of the craft during the movement thereof. The drag is very slight in level flight. FIGS. 6 and 7 illustrate the rear and front views, respectively, of the craft 10 in the level flight mode shown in FIG. 3.

FIG. 4 illustrates the cross sectional configuration of wrap-around sections 14 and 30 for achieving a high lift as the craft moves through the air. The struts within the forward wrap around section 14 are manipulated for curving the outer periphery of the wrap-around section 14 upwardly while the struts within the wrap-around section 10 are manipulated for curving the outer periphery thereof inwardly and downwardly to achieve a control of the flow of air over the outer periphery of the body or craft as indicated by the arrows. The lift action on the craft is also indicated. The configuration of the craft in the high lift mode is ideal in emergency conditions or free fall conditions since it employs the slowest descent in a power off condition. Testing with models indicates that the vehicle 70 would sustain loads of less than three to four "G's" in a free fall condition with the wrap-around sections "warped" into the configuration illustrated in FIG. 4. FIG. 8 illustrates the front view of the craft 10 in the high lift mode shown in FIG. 4.

FIG. 5 illustrates the configuration of the wrap-around sections 14 and 30 in the fast descent mode of operation for the craft moving through the air. The arrows indicate the flow of air around the outer periphery of the craft, with the effect of push also being shown. FIG. 9 illustrates the front of the craft in the fast descent mode shown in FIG. 5. In this position, the struts within the wrap-around section 14 have been manipulated for curving the outer periphery of the section 14 downwardly while the struts within the wrap-around section 30 have been manipulated for curving the outer periphery of the section 30 upwardly and outwardly.

Figure 10:
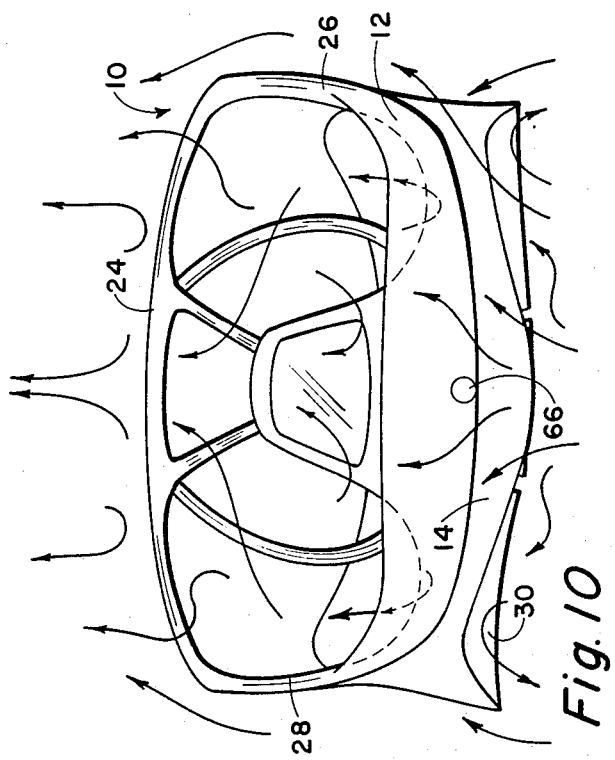
FIG. 10 is a view similar to FIG. 7 depicting a high lift or free fall operational mode for the vehicle through the air.

FIG. 10 is a view somewhat similar to FIG. 8, but includes the location of the center of gravity of the craft 10, and the arrows indicate the flow of the air over and around the craft in the high lift mode during free fall. The particularly selected configuration for the outer periphery of the body 12 in combination with the selected warping of the wrap-around sections 14 and 30 result in a gently downward movement for the craft in the free fall condition, whereby the craft settles to the surface of the ground with ease to provide a safe landing from which the operator may safely walk away from the craft.

Figure 11:
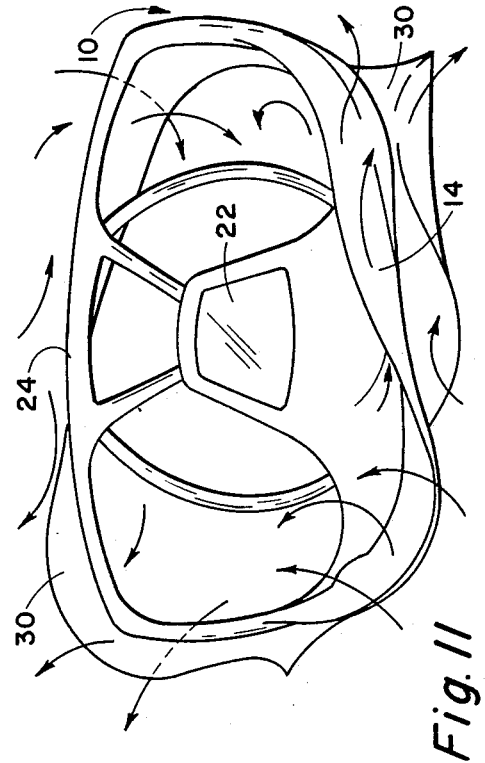
FIG. 11 is a view similar to FIG. 7 illustrating a warping mode for a right turn of the vehicle in the air.

FIG. 11 is a front view of the craft 10 illustrating the warping of the wrap-around sections 14 and 30 for achieving a right hand turn as the craft moves through the air. The arrows indicate the flow of the air around the craft in this mode whereby the air flow facilitates the maneuvering of the craft through the turn.

Figure 12:
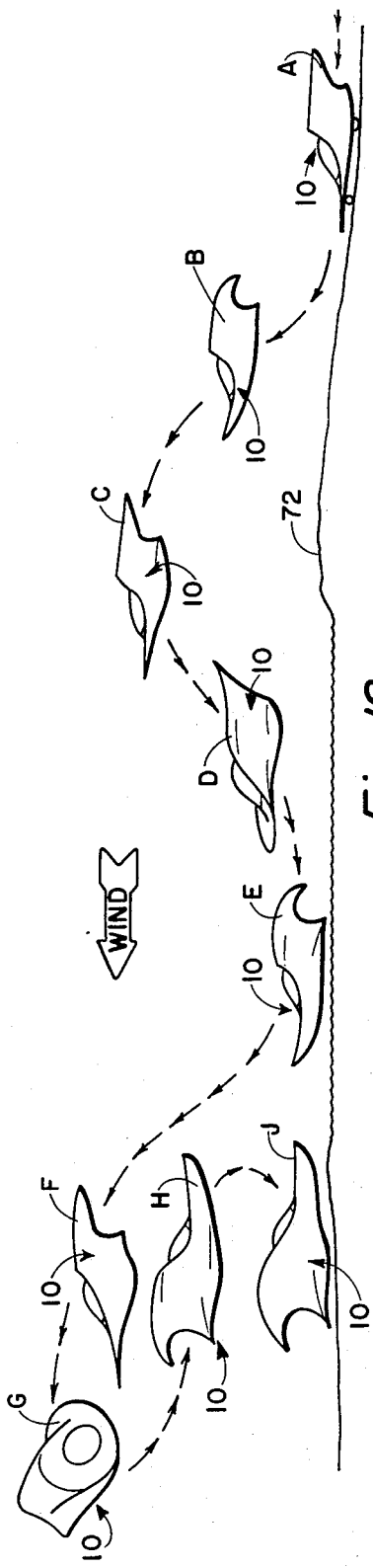
FIG. 12 is a schematic elevational view depicting a flight path for a vehicle embodying the invention and illustrating the horizontal attitude in relationship to horizon by coordinated controls.

FIG. 12 is a schematic view illustrating a flight path of the craft, the arrows indicating the direction of travel therefor. The position A shows the craft as moving over the surface 72 of the ground, as in the land mode of the craft. As planing power is achieved by the actuation or operation of the engine 46, the lifting forces acting on the contours of the outer periphery of the body in the lifting mode thereof lift the craft into the air as shown at position B. When the desired cruising height has been achieved, the level flight mode for the craft may be utilized as illustrated at position C. When descent is desired, the wrap-around sections 14 and 30 may be warped to the descent positions therefore, as shown in position D. As the craft approaches the surface 72, it may be desirable to avoid a complete landing, whereupon the craft may be placed in the lift mode, as shown at position E, whereupon the craft will ascend until the contour thereof is returned to a level flight or planing position as shown at position F. The craft may be turned by warping the sections 14 and 30 as hereinbefore set forth and as shown at position G. If it is not desired to land the craft on the surface 72, the craft may be placed in the lift mode, and the power shut down or turned off as shown at position H, whereupon the craft will free fall or settle gently onto the surface 72 of the ground as shown at position J. It is to be noted that the craft 10 remains horizontally disposed or in level flight at all times.

The struts are preferably embedded within each wrap-around section 14 and 30 in such a manner that one substantially continuous strut extends around the outer periphery of the wrap-around section, with a plurality of spaced inwardly directed struts extending from the outer strut. The inwardly directed struts may be lengthened and shortened by proper manipulation of the steering mechanism for flexing of the outer strut in the proper manner for warping of the respective wrap-around section. This feature of varying the outer contours of the craft 10 provides extreme flexibility of control for the craft and essentially "molds" the body of the craft into the optimum configuration for each maneuver required for the craft. This feature coupled with the extreme lightweight and strong construction provides a novel multi-use craft of great efficiency and safety.

The entire engine or power plant assembly 38 may be quickly and easily removed from the craft to facilitate maintenance thereof. The ease of access to all parts of the power plant when removed from the craft greatly enhances repair or the like of the power plant. Furthermore, a new power plant may be installed in the craft while the initial power plant is being repaired, if desired, for reducing "down time" for the craft.

The ducted fan shroud 32 coupled with the even flow propeller blade creates a balanced venturi effect over the entire upper surface of the body 12, to give a balance to all air movement over and about the craft. In fact, the mechanics of the overall design of the craft are in balance to each other in regard to size, air flow and weight. Air effects are balanced by these particularly selected designs, but are enhanced by the "humps" 62 and 64 provided at the front left and right of the center of gravity in the upper surface. In addition, they are stabilized by the centrally disposed "hump" 74 (FIG. 2) on the lower or bottom surface of the body 12 and disposed to the rear of the center of gravity.

Whereas the particular embodiment of the craft 10 depicted herein is a single passenger model, it is to be understood that the versatile design configurations of the craft may be adapted to substantially any size desired. For special applications it is anticipated that the craft will have a high cruising speed, as for example over 200 mph at small horsepower powerplants, and a slow landing speed, with full control at less than 20 mph. It is further anticipated that the ceiling will only be limited by the power source with the ceiling range expected to be approximately 20,000 feet for the general air cooled type engines.

The overall construction of the craft is generally expected to be modular whereby the components of the main body may be molded in a rigid or semi-rigid form material or the like, while the deformable peripheral means may be molded in semi-rigid or flexible foam material. The well known shot foam injection molding may be utilized in the construction of the basic forward wrap-around section and rear wrap-around section. The base plane of the craft may be molded from a rigid foam material, as well as the rear section and entire top section. These sections may also include the areas of the vertical planes on the sides of the craft wherein all of the control mechanism will be installed. All of the controls originate in the cockpit area, thus nothing must be adjusted or attached to the outer periphery of the craft. The molded sections of the craft may be assembled and secured together by any suitable fastening material such as in widespread use in the plastic industry. A prototype has been constructed of laminated foam and model airplane type rib construction.

FIG. 13 illustrates the structural skeleton of one preferred embodiment of the deformable peripheral means showing a typical strut 80 consisting of an upper rib element 82, a lower rib element 84 and central rib 86 with perpendicular cross members 88, 90, 92, and 94 of sequentially shorter length as the rib elements 82, 84 and 86 converge at the leading edge. The upper rib 82 and lower rib 84 are attached to cables 96 and 98 while the central rib 86 attaches to support element 100 which in turn rests on a portion of the main body 102 of the vehicle. As further illustrated a pair of pipe conduits 104 and 106 pass through the main body 102 and have the control cables 96 and 98 threaded therethrough. As shown in silhouette (dashed lines) when cable 96 is pulled and cable 98 extended the entire strut bends upward at the tip. Similarly, if cable 96 is extended and cable 98 pulled the strut bends downward (not shown). By coordinating the relative motion of a plurality of such struts the overall molding of the flexible deformable peripheral means by a warping action is achieved. In the particular embodiment of FIG. 13 a leading edge cable 108 attaches perpendicularly at the tip of the strut and circumvents the entire peripheral of deformable front wrap-around surface before attaching to the main body (not shown).

FIG. 14 illustrates the structural skeleton of FIG. 13 along with the flexible filler foam 110 and flexible skin 112. Optionally the inner section of the main body 102 can be filled with rigid foam 114. Typically the flexible foam is an elastomeric urethane or the like. In one particularly preferred method of construction the flexible peripheral portion is filled with urethane foam that has preferably cylindric cores of foam periodically removed perpendicularly relative to the moveable ribs of the strut (to eliminate wrinkling). A thin outer sheet of flexible foam is then adhesively applied over the perforated foam and struts. A flexible outer skin is then applied to the flexible foam. One preferred method of construction of the skin is to apply sequentially an industrial grade rubber coating, such as a material sold by PDI, Inc. of St. Paul, Minnesota under the tradename PLASTIC DIP, followed by cheesecloth and an outer second layer of rubber coating. If necessary multiple layers can be employed along with a pigmented outer coating. Typically the cable conduits are made from PVC pipe.

FIG. 15 shows the relative position of a strut 116 in the forward wrap-around flexible deformable peripheral means and a strut 118 in the rear wrap-around flexible deformable peripheral means of a vehicle according to the present invention silhouetted by dashed lines.

FIG. 16 is a perspective view of the rear wrap-around flexible deformable section 120 relative to a cut-away skeletal view of the inner elements of the front wrap-around flexible deformable section and steering control mechanism 122. As illustrated in FIG. 16 the rear section 120 has two sets of pairs of control leads or cables 124 and 126 exiting at the upper horizontal deformable surface for creating warp therein and a pair of single control cables 128 and 130 on opposite sides to create warp in the vertical deformable surfaces. The bottom pair of cables 132 and 134 are used to establish proper trim in the lower trim tabs 136 and 138 independent of the control mechanism. As seen in the cut-away view of the front wrap-around section, the beveled gears of the steering wheel assembly 122 produce a back and forth motion (see double pointed arrows) in the control cables 142 and 144 based on both a rotation or back and forth movement of the wheel assembly 122. The cables 142 and 144 then drive the wheels 146 and 148 which in turn drive the auxilliary wheels 150 and 152 by transmitting torque through flexible linkages 154 and 156. The cables attached to the auxilliary wheels 150 and 152 then bend the deformable surface by raising or lowering the individual struts 155 and 157 as previously described. The middle strut 158 is connected between the wheels 146 and 148 by cable system 160 and as such is nonresponsive when the relative motion induced by wheels 146 and 148 cancel each other. This in turn allows for the warping action during control of the vehicle. The outer tips of the various struts are interconnected by the cable 162 as previously described in FIG. 13. For all practical purposes the flexible linkages 154 and 156 and driven wheels do not have to be rigidly anchored to the main body and as such serve as a flexible drive shaft for the steering operation.

FIG. 17 illustrates a closeup of the elements shown schematically in FIG. 16 with certain variations. As seen in FIG. 17, the strut 164 is a molded unit with the leading edge cable 166 imbedded in the flexible foam 168 in front of the tip of the strut. Also, the driven wheel 170 which drives the flexible linkage 172 also has cables 174 and 176 that bend the strut 164, as previously described. The linkage 172 can be seen to be constructed of a woven hose for high transfer of twist while the outer flexible sealer skin 178 covers the foam 168 containing the imbedded strut 164.

FIG. 18 illustrates an alternate embodiment of the invention wherein the strut 180 of a front deformable surface allows for a dual level or stage of steering control. In this particular embodiment the strut 180 is made up of a plurality of straps of material such as polycarbonate or the like. As illustrated the straps 182 and 184 are superimposed and extend from the connection with control cable 186 to the front of the strut and then back to the connection with control cable 188. Strap 182 is on top of strap 184 and slightly greater in length such that the point where each strap bends is a different distance from the outer edge of the deformable surface. Again, a cable 190 extends perpendicularly from strut tip to the next strut tip; however, between the bends in the straps is a sheet of rigid but flexible structural plastic 192 (again such as polycarbonate). Attached to the inner bend of strap 184 is a short segment of pipe 194 with a second cable 195 threaded therethrough. On the inner central portion of the strut 180 is a second sheet of rigid but flexible structural plastic 196 similar to sheet 192. These sheets extend from strut to strut with a spacing therebetween that accomodates free rotation of cable 195. Additional support straps 197, 198, 199 and 200 complete the strut. The central ends of these straps and sheet 196 are supported by the main body (not shown) and as such the overall raising and lowering action is achieved when cables 186 and 188 apply tension (are pulled in a coordinated motion). However, in this particular embodiment a slight push and pull of cables 186 and 188 immediately produces an articulation or bending at the tip of the strut about the cable 195. Cable 195 can then be used as a passive steering linkage to transfer this small warping action (steering control) from the front deformable surface to the rear deformable surface (see FIG. 19) thus coordinating the warping motion during small bending. This motion essentially allows for small deflections during high speed operation and large, less sensitive, deformations during slower speed operation. To further optimize this dual stage control the selection of foam density near the bends of straps 182 and 184 can be varied (preferably lower density foam) relative to the rest of the deformable surface.

FIG. 19 illustrates a typical control mechanism for steering a vehicle according to the preferred embodiment of FIG. 18. As illustrated in FIG. 19 a steering wheel assembly 202 (as previously described) delivers a push/pull motion forward along pairs of cables 204 and 206 to the driven wheel and flexible linkage assemblies 208 and 210 which in turn bend the individual forward struts (shown in silhouette). The steering wheel assembly 202 also delivers a push/pull motion rearward along pairs of cables 212 and 214 and then upward and again rearward through additional pairs of cables 216, 218, 220 and 222 and pivoting crossed lever arm assemblies 224, 226, 228 and 230. The rearward directed push/pull motion then drives the horizontal portion of the rear wrap-around deformable surface.

The imbedded cable 230 passing through the outer portion of each forward strut (as described in FIG. 18) bends back around the front wrap-around deformable surface and drives pairs of cables 232 and 234 located on opposite sides of the vehicle. The push/pull motions secondarily induced on cables 232 and 234 are then transferred through pivoting crossed level arm assemblies 236 and 238 and single cables 240 and 242 to produce a corrdinated movement in the vertical sidewalls of the rear wrap-around section, thus accomplishing the steering motion of the vehicle.

It is further preferable that the propeller of fan 48 generally will be constructed in a laminated process for synthetic material and natural materials, such as resins and wood, metals and the like, or wood strips glued together to form the laminated structure of course there is no intention of limiting the propeller to this particular construction. The contour of the blades of the propeller are streamlined for proper aerodynamics to achieve an even flow of air over the entire back surface of the craft 10. This is particularly important for stabilizing the control of the craft at slow speeds. This even air flow throughout the entire area of the back end of the craft provides a very stable flight at slow speeds.

In an emergency situation which may arise when the craft 10 should accidentally lose power, or for some other reason begin to fall, wind or air resistance will build up toward the back of the craft and the air flow produced around the craft by the resistance forces around the craft is cupped by the rear section to provide a relatively high drag force on the body to slow the speed of the craft, thus producing a settling effect rather than a hurtling or falling effect.

Of course, suitable seating means (not shown) is provided in the cockpit area 16 for the comfort of the operator 18 and payload with the seating means preferably being constructed of a suitable light weight flexible plastic material molded to fit upholstery fabric similar to the construction of the other parts of the craft 10, thus maintaining the overall lightweight construction for the craft. The controls (not shown) associated with the steering mechanism 68 may be of any suitable conventional or well known type, thus further increasing the ease of learning the proficient operation of the craft, both on land, water and in the air.

From the foregoing, it will be apparent that the present invention provides a novel vehicle or craft having enormous versatility in that it may be utilized for ground travel in much the same manner as the usual or well known motorcycle with training wheels, which not only provides convenient ground travel, but also an economical mode of transportation. This feature also eliminates the need for storage of the craft in the usual aircraft hangar since the craft may be easily driven into a garage, or the like, subsequent to landing after airborne use. Of course, the craft may be equally efficiently driven over land or through air space to a water area and driven right into the water at or over the boat ramp, thus eliminating much of the effort normally required for the launching of the water craft. The novel multi-media craft is provided with a lightweight construction particularly contoured for an efficient balance during air travel for making the most efficient utilization of the air flow over and around the craft, resulting in a safety of flight operation for even an inexperienced operator. The forward and rear sections of the craft are constructed in a manner for variable contouring thereof during use of the craft for providing the most efficient outer configuration for the vehicle, particularly during flight conditions.

What is claimed is:

1. A multipurpose craft comprising a main body having a cockpit section facing forward with trailing portion therebehind, power means disposed on the main body, a flexible deformable peripheral means extending substantially around and extending radially outward from the main body for selectively forming, altering and molding by warping action during operation of the craft for controlling the movement of the craft.

2. A multipurpose craft as set forth in claim 1 wherein the power means is readily removable.

3. A multipurpose craft as set forth in claim 1 wherein the trailing portion of the main body is of a substantially cylindrical configuration surrounding the power means.

4. A multipurpose craft as set forth in claim 3 and including rail and track means cooperating between the main body and power means for facilitating removable and installation of the power means on the body.

5. A multipurpose craft as set forth in claim 4 and including air scoop means disposed within the trailing portion of the main body and carried by the power means for facilitating the operating performance of the craft.

6. A multipurpose craft as set forth in claim 1 wherein the main body is of a modular construction.

7. A multipurpose craft as set forth in claim 1 wherein the main body is constructed of a strong and lightweight material.

8. A multipurpose craft as set forth in claim 3 wherein the power means comprises a motorcycle-type engine, and variable pitch propeller means operably connected therewith.

* * * * *